Nov. 14, 1961 C. W. JACOB 3,009,077

GAS DISCHARGE TUBE SENSITIVE TO A.C. SIGNALS

Filed March 12, 1951

CARLYLE W. JACOB
Inventor

By G. W. O'Brien

Attorney

United States Patent Office 3,009,079

Patented Nov. 14, 1961

3,009,079

X-RAY INTENSIFICATION SYSTEM

John E. Jacobs, Schenectady, N.Y., assignor to General Electric Company, a corporation of New York Filed Apr. 26, 1960, Ser. No. 24,694
6 Claims. (Cl. 315—10)

Figures 1, 2, 3, 4:
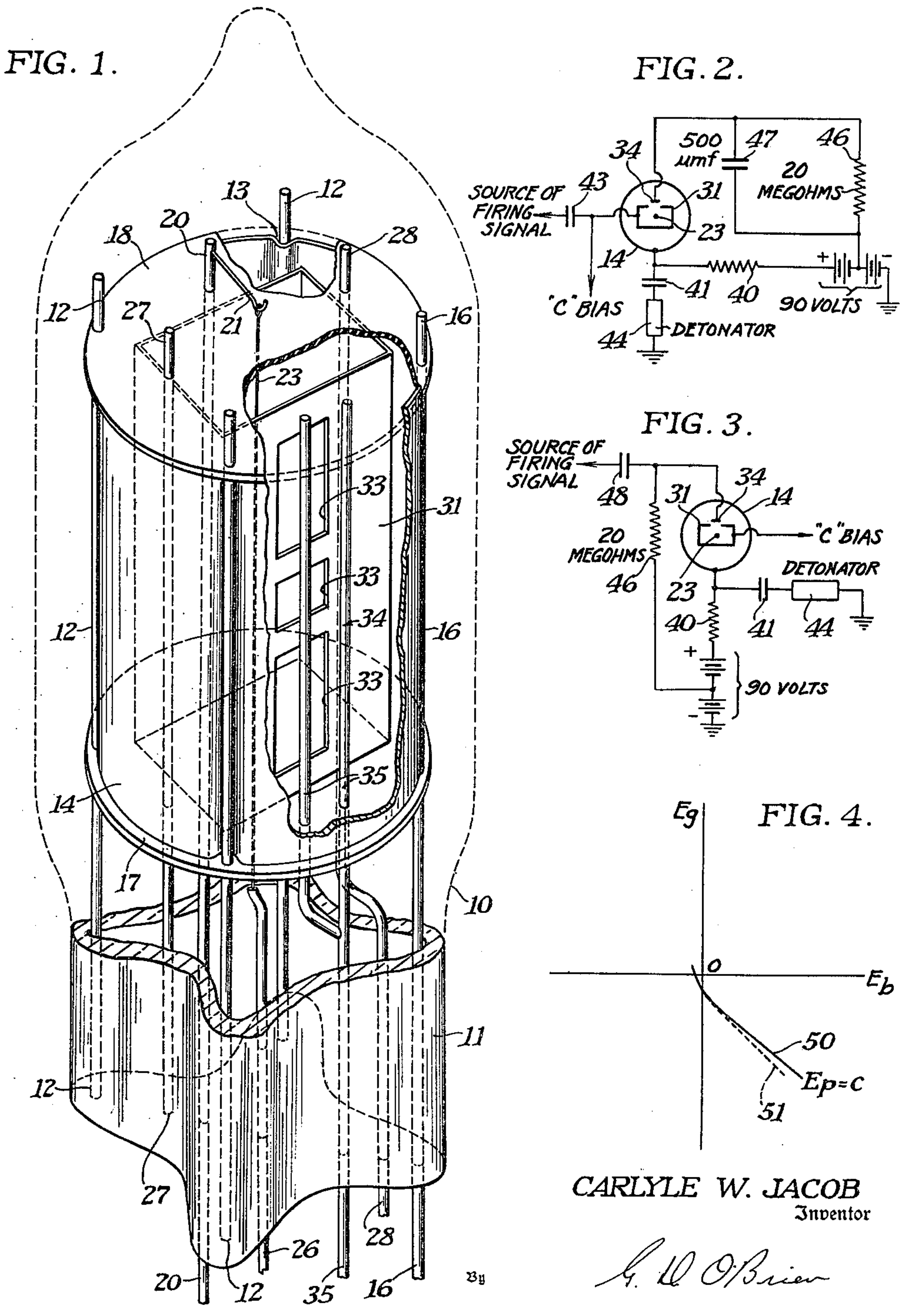

This invention relates to the generation of X-ray initiated images in a television system, and more particularly, to devices and systems for the generation of X-ray initiated images which are more readily discernible on the viewing or monitor screen by virtue of less blurring of the image in the case of fast-moving subjects than has heretofore been possible.

In and for the purposes of the discussion to follow, the expression "X-ray image intensification system" or "X-ray sensitive television system" will be used to mean a television system wherein X-radiation passed through a test subject is applied to, and forms a latent image upon, a transducer for converting from X-radiation to electrical signals; the electric signals are introduced into a television system (similar to a closed circuit system) for subsequent viewing on a standard monitor.

This application is a continuation-in-part of my copending application, Serial No. 741,337, filed June 11, 1958, now abandoned.

With the invention of an X-radiation-to-electrical impulse transducer, hereinafter referred to as an "X-transducer" tube, such as that disclosed in United States Patent No. 2,809,323, of which I am coinventor, the application of X-ray techniques to closed circuit television was possible. The advantages inherent in an X-ray sensitive television system for both medical and industrial purposes are now well known, especially since the advent of commercial use of such systems. The use of the X-transducer tube in a television system was a seemingly logical outgrowth of the invention of the tube, since certain of its characteristics are similar to those used advantageously in prior art television pick-up tubes. For example, the sensitivity of the storage type camera tubes priorly known in the art, such as the iconoscope, or Vidicon, is to large measure found in my above-mentioned X-transducer, and the increased sensitivity familiar to the television art was for the first time available in X-ray technology. More explicitly, it was known that with a storage type camera tube, the charge on the tube could be built up or integrated over the entire period of the frame by virtue of the storage capacity of the tube. Consider the scan procedure of a TV storage tube that has approximately 200,000 picture elements. The interval required to scan each element is $1/200,000$ of the frame time (or $1/6,000,000$ of a second with a 30 frame per second rate). During the rest of the frame period, each picture element has the opportunity to build up charge while the other elements are being scanned. Thus, by having continuous exposure during the frame, the sensitivity of the tube is tremendously increased over a non-storage type operation, wherein the sensitivity of the tube is a function exclusively of the excitation of the picture elements at the time that they are scanned. In the situation just described, the sensitivity of the storage tube would ideally be 200,000 times greater than that of the "non-storage" tube. For a detailed discussion of various storage and non-storage tubes, reference may be had to "Television Engineering Handbook," edited by D. G. Fink, chapter 5 (McGraw-Hill 1957).

It is the storage capacity of the tube that has in large measure been responsible for the success and practicality of operation of commercially available television systems. Such a characteristic had obvious practical benefits for an X-ray system where it would be desired to maintain X-ray dosage as low as possible, especially in medical applications. By the nature of the X-transducer in an electronic system, much lower levels of X-radiation can be used because of the subsequent enhancement possible by electronic amplification than was possible in X-radiography or cinefluoroscopy. With this inherent capacity coupled to the storage characteristic of the X-transducer, the dosage to the patient could be kept extremely low, with the thought in mind that the tube would effectively integrate the dose rate over each frame period.

In the case of the X-ray sensitive television system, it was soon found, however, that difficulties existed in the form of a blurring of the image resulting from a phenomenon now to be referred to as "photoconductor current lag" when the object observed moved rapidly relative to the frame rate. As pointed out in my above-mentioned joint patent, the X-ray-electrical signal transducer utilizes photo-conductive material upon which the X-radiation impinges for the conversion process.

The radiation thus applied to the tube does not instantaneously produce a latent image, i.e., does not instantaneously generate a charge pattern across the face of the tube commensurate in magnitude with the initiating or exciting X-radiation. In other words, there is a finite rise time for the build-up of the charge on the X-transducer tube and so the formation of the latent image lags behind the application of X-radiation to the tube. Thus, the maximum charge on a given portion of the tube occurs only after the maximum X-ray input rate to that portion of the tube has already been applied for some finite time. To those skilled in the art it will be recognized that, strictly speaking, the radiation discharges rather than charges the tube, and that the latent image is formed by what is sometimes called the "signal charge."

In a general sense, this rise time may be considered an inertial response of the photo-conductive material in its transducing properties. In addition to a rise time, the photo-conductive material has a finite decay time. The finite rise and decay times result in an inevitable blurring of the image produced by the system if there is motion of any substantial amount, that is, of a speed large relative to the frame rate. For example, consider an object in a first position at the beginning of the frame period, which during the frame period moves somewhat. Radiation is applied to the tube at the beginning of the frame period which represents the object in the first position, and radiation is applied to the tube continuously during the frame period representing the subsequent positions. If the intensity of the radiation at the instants related to the successive positions is sufficient to form a latent image of intensity greater than the noise of the system, then a blurring effect results due to the signal overlap inherent in the existence of finite rise and decay times. This "smearing out" of the signal results in a type of blurred image that is analagous, for example, to a double exposure in photography, except that the impinging X-radiation is in continuous form and the blurring would be a more "smeared out" type than would the superposition of two discrete images characteristic of a double exposure.

Not only may a blurring of the image result as a consequence of the finite rise time, but a complete loss of certain detail may result under certain circumstances. Consider the case of a small object in motion having the characteristic that it displaces its entire dimension during one frame period, and further, that it is of the type such that the X-radiation reaching the X-transducer tube is barely sufficient to register above the noise level of the system, even if the object were completely stationary during the frame period. Had the small object been stationary during the entire frame period, sufficient X-radiation would impinge on the X-transducer tube on the appropriate portion thereof to build up enough charge on barium and strontium oxides to insure a copious supply of electrons.

A rigid rod 27 and a lead-in conductor 28 extending upward from the press 11 and through apertures in the insulating discs 17 and 18 engage a generally tubular metallic control grid 31 disposed coaxial with the cathode 23 between the insulating discs 17 and 18. The insulating discs 17 and 18 thus close the upper and lower ends of the control grid 31 and also fixedly position the lead-in conductors 16 and 28 and the rods 12 and 27 to maintain the anode 14 and the control grid 31 coaxial with the cathode 23. By the word "tubular" in this connection is meant any form having a substantially perimetrically complete contour whether such contour be circular or noncircular. In the preferred embodiment of the invention illustrated in the drawings, a rectangular contour is utilized. A plurality of apertures 33 are provided in the grid 31 aligned along the length of the cathode 23.

My invention is particularly concerned with a balancing electrode 34 positioned in front of the apertures 33 in the path of electronic flow between the cathode 23 and the anode 14. The balancing electrode 34 comprises two spaced rigid rods 35 disposed between the control grid 31 and the anode 14 and extending parallel to the cathode 23 through apertures in the insulalting discs 17 and 18. One rod 35 is an extension of a lead-in conductor extending through the press 11 and is soldered to the second rod 35 below the insulating disc 17.

While the particular structure of the tube as illustrated in the drawings is the preferred embodiment of the invention, other elements of the electrodes relative to one another, as regards spacing and configuration, which perform the functions explained are within the scope of the invention. It is obvious that the balancing electrode may comprise a single, or any desired number, of rigid rods 35 in the path of electron flow between the anode and cathode.

The utility of such a gaseous device is shown in the circuit of FIG. 2 which represents a conventional firing circuit of a radio proximity fuze. The electrodes of the tube in FIG. 2 bear the same reference numerals as those of FIG. 1 and are schematically represented as though a horizontal sectional view were taken through the electrode structure. After a projectile containing a radio fuze is fired, a source of filament voltage is connected to the cathode 23 and a source of anode potential of approximately 90 volts positive with respect to the cathode 23 is connected to the anode 14 through an arming resistor 40, conventionally from the "A" and "B" sections respectively of a deferred action type battery (not shown) contained within the fuze. An arming condenser 41 connected to the anode 14 is in series with an electric detonator 44 to ground. The arming condenser 41 provides the energy to fire the electric detonator 44 when the discharge device of the invention fires and conducts current. The arming resistance 40 and the arming condenser 41 in combination provide a time delay to prevent the bursting charge from exploding until the projectile is well away from the gun and from firing personnel. In order to prevent breakdown of the gas-filled tube of the invention in the absence of an operating signal, a source of bias voltage negative relative to the cathode 23 is connected to the control electrode 31. The operating signal from the amplifier (not shown) of the fuze is coupled to the control grid 31 through a condenser 43.

Conventionally, the source of negative grid bias for the control grid 31 is the "C" section of the deferred action type battery of the fuze. As hereinbefore explained, this "C" section is subject to decay in output voltage during the flight of the projectile, and in order to eliminate any possibility of premature detonation, it was necessary to maintain the control grid of gas-filled discharge tubes heretofore used considerably more negative than the starting voltage. Consequently an operating signal of considerable amplitude was required to overcome the negative bias and cause discharge of the gas-filled tube.

To provide a gas-filled device which is sensitive to A.C. signals and at the same time prevent any possibility of accidental discharge, the balancing electrode 34 is connected through the parallel arrangement of a resistor 46 and a condenser 47 to a source of potential positive relative to the cathode 23. For every anode potential the discharge device of the invention has a critical flash point function (i.e., control characteristic) of control grid voltage $E_g$ and balancing electrode voltage $E_b$. A typical control characteristic curve 50 for a given anode voltage is shown in FIG. 4 of the drawing plotted with values of $E_b$ as abscissae and values of $E_g$ as ordinates. Any combination of $E_b$ and $E_g$ that determines a point above and to the right of the flash point function 50 indicates that the shielding action of the control grid 31 and balancing electrode 34 are insufficient to limit the anode electron current to a value below the minimum required to establish the arc; but if the point is determined below the flash point control characteristic 50, the shielding action of these two electrodes is sufficient to limit the anode current below this minimum. That is, the arc starts as electrode potentials pass across curve 50 from the lower left to the upper right.

The balancing electrode 34 acts to compensate for changes in electron flow due to drifts in the voltage of the control grid "C" bias source by limiting the electron current to the anode below the minimum required to start the arc even though $E_g$ may drift from its preferred negative value to an excessively low negative value, i.e., drift in a positive direction, due to a defective deferred action type battery. As $E_g$ slowly becomes more positive due to drifts in the voltage of the "C" bias source, a few electrons emerge through the apertures 33 in the control grid 31 and are drawn primarily to the balancing electrode 34. Substantially all the electrons flowing through the apertures 33 are collected by the balancing electrode 34 and flow through the resistor 46, thereby lowering $E_b$ by an amount equal to the voltage drop across this resistor 46. The increased shielding action of the balancing electrode 34 thus prevents increased electron flow to the anode due to gradual changes in $E_g$.

The voltages of the control grid "C" bias source and the balancing electrode source are selected so that the combination of $E_b$ and $E_g$ are just below, i.e., on the non-flash side of the control characteristic 50 of the tube. $E_b$ and $E_g$ are balancing voltages in that $E_b$ is inversely dependent upon $E_g$ so that the combination of voltages determines points which are on the non-flash side of the critical flash point function 50 even though the output voltage of the "C" bias source may vary over a wide range. The dotted curve 51 in FIG. 4 is drawn through points determined by such combinations of $E_b$ and $E_g$. It will be noted that all points on this dotted curve 51 are below, i.e., on the non-flash side of, the control characteristic 50 for a considerable range of variation of $E_g$. As $E_g$ drifts positively it drives $E_b$ less positive so that both move along the curve 51.

It is apparent that if means are provided to momentarily raise either $E_b$ or $E_g$, i.e., make either more positive, without significantly changing the voltage of the other, the combination of voltages will then determine a point above the control characteristic and cause the tube to fire. My invention includes means for applying an A.C. signal to either the control grid 31 or the balancing electrode 34 without significantly changing the potential of the other. In the embodiment of the invention illustrated in FIG. 2, the condenser 47 in parallel with the resistor 46 allows the discharge device to exhibit differential sensitivity to gradually changing voltages and to rapidly varying signals. Changes in electron flow due to variations in $E_g$ change the voltage drop across the lizes the storage property in a unique manner to solve the problem of finite rise time. Recognizing that the integration of a weak signal over a frame period is at the heart of the problem, in the instant invention a strong signal is applied to the X-transducer tube for an extremely short period of time, while relying on the storage properties of the tube to hold the latent image for subsequent scanning during the remainder of the frame period. Consider, for example, the arrangement prior to the invention, using a frame period, for example, of $1/30$ of a second or approximately 30 milliseconds (taking into account blanking and vertical retrace times) wherein the mean level of the X-radiation to the tube is some value $x$-micro-roentgens per millisecond such that $x$ multiplied by 30 milliseconds is a medically safe exposure to the patient. Let us assume further, however, that such an integrated dosage is barely sufficient to provide a discernible image so that the difficulties consequent upon a finite rise time are of concern. In contrast, and in accordance with the invention, X-radiation is applied to the X-transducer tube, not continuously over the 30 millisecond frame period, but in discrete pulse form for two-tenths of a millisecond, and only during the vertical retrace time of the scan beam. Furthermore, the mean intensity of the X-radiation during this abbreviated period may be one hundred and fifty times the mean intensity of the continuous exposure of the prior art arrangement, i.e., at an intensity of $150x$ micro-roentgens per millisecond. With the application of such a pulse, the integrated dosage remains the same as before, but the intensity of the signal while it is applied to the tube is so considerably greater than before, that the rise time is practically nil. In any event, the relatively instantaneous application of a large signal over a short period of time will much more rapidly saturate the traps and fill the conduction band above the minimum required threshold than is possible with a signal only $1/150$ times as great, spread out over a period of time 150 times longer.

Furthermore, the storage properties of the tube are not wasted and are actually essential for this arrangement in accordance with the invention. Since the exposure is made during the vertical retrace time or at most during a fraction of the frame period, it is of the essence that the tube store the latent image during the scan or frame period, so that the latent image can be sensed by the scan signal. It is precisely because the tube provides this storage property that the advantages of the invention are possible, and in fact, a non-storage type scan tube could not do this job.

The system in accordance with the invention, then, involves synchronizing an X-ray tube with, for example, the vertical retrace time of the pickup X-transducer tube and briefly pulsing the X-ray tube at a high signal level in synchronism with the vertical retrace. For various subjects interposed between the source of X-radiation and the X-transducer tube, different intensities of X-radiation are required, and therefore different pulse magnitudes are appropriate. In any event, with a given pulse width (which may be less than or equal to the vertical retrace time) the larger the pulse amplitude, the smaller will be the amount of photo-conductor lag exhibited, if any. If needed to obtain the proper integrated dose, the pulse width may be made greater than the vertical retrace and extend partly into the scan period.

This high intensity pulse technique and circuitry provides an additional by-product advantage in eliminating blurring by virtue of stopping the motion of fast-moving objects. This additional advantage is the one commonly known in photographic techniques as the stroboscopic effect, wherein a very short exposure time with high intensity light is applied to stop the action, merely by virtue of the fact that very little motion in the subject can occur during the extremely short period of exposure.

In the preferred embodiment of the invention to be described in greater detail below, the synchronized pulsed X-ray source is used in conjunction with an X-ray image intensification system utilizing a slow frame rate so as to achieve the advantages of narrow bandwidth in the system, whereby inexpensive recording equipment may be utilized if recording is desired, or inexpensive and narrow band transmission facilities may be utilized if transmission of the signals over long distance is desired. It is to be understood, however, that the principles of the invention are not restricted in any sense to a particular frame rate or period.

The foregoing, and numerous other objects, advantages and features of the invention will become apparent from the following description, considered in conjunction with the accompanying drawings, of a preferred embodiment of the invention.

Referring to the drawings, FIGS. 1 and 2 are diagrammatic representations of an X-ray image intensification system wherein reference numerals 31 through 49 of FIG. 1 represent that portion of the system comprising the X-ray source and equipment for pulsing the source in synchronism with the vertical retrace of the X-transducer, while numerals 11 through 29 of FIGS. 1 and 2 represent the rest of the system, including the image recording and reproducing portion thereof.

In the description of follow, that part of the system represented by reference numerals 11 through 29 will be presented first and the X-ray source and pulse control portion represented by numerals 31 through 49 will follow.

To illustrate the invention the drawings show an X-ray sensitive pick up tube 11 having a photosensitive screen 12 adapted to receive picture carrying rays 13, such as X-rays, emanating from a suitable ray source and latently carrying the image of an object 14 disposed in the path of the rays, between the ray source and the screen 12. This tube is adapted to produce electrical impulses corresponding with the characteristics of the picture image applied on the screen 12. To this end, the iconoscope 11 may embody an electron gun structure 15 and associated components for applying a scanning beam 16 upon the screen 12 in order to produce signals corresponding with the picture image applied in the screen.

While any suitable or preferred tube may be employed, the present invention contemplates use of a picture transducing device of the sort shown in U.S. Letters Patent No. 2,809,323, in which, through the action of the scanning beam 16, the picture image applied on the screen 12 may be accurately defined in terms of a fluctuating signal voltage developed across a resistor 17 and applied thence through a condenser 18 to any suitable or preferred amplifying system 19.

Any suitable or preferred means may be employed for controlling the scanning movement of the beam 16. As shown, the vertical and horizontal beam controlling components of the gun structure may be energized by connection with vertical and horizontal sweep generators 20 and 21 of any suitable, preferred or conventional character. Since the present invention contemplates operation of the X-transducer to scan the picture image at a relatively slow rate of speed of the order of one complete scan of the picture per second, one of the sweep generators should be operated at a corresponding scanning frequency of the order of one cycle per second, while the other sweep generator should be operated at a frequency sufficient to obtain as many scanning sweeps of the beam 16 as may be required to perform a complete scan of the picture image in the selected scanning interval.

In order to record the picture defining signal developed at the resistor 17 and transmitted thence to the amplifier 19, the output side of said amplifier and the sweep generators 20 and 21 may be connected with any suitable, preferably magnetic, recorder 23 capable of accurately recording the relatively low frequency signals transmitted through the amplifier 19. To this end, the recorder 23 may comprise a conventional, inexpensive magnetic tape recorder having 30–80 kilocycle response characteristics. The recorder 23, of course, may be connected with the amplifier 19 and also with the sweep generators 20 and 21 through a mixing circuit 24 of any preferred or conventional character.

A picture record thus produced by operation of the recorder 23 may not only contain a picture defining record of the signal developed at the resistor 17, but also recorded signal components corresponding with the scanning beam control signals produced by the sweep generators 20 and 21. Accordingly, the recorded picture defining signals may be reproduced by means of apparatus of the sort illustrated in FIG. 2, the same comprising a conventional video picture reproducing tube 25 of the sort commonly employed for television picture reproducing purposes. Such a tube may comprise a sealed and evacuated envelope having a wall 26 of transparent material, such as glass, and embodying a picture reproducing screen 27 of fluorescent material adapted to glow in response to electron impingement thereon. The tube envelope remote from and opposite the end wall 26 may be formed to enclose and support an electron gun structure 28 for generating and applying a pencil-like scanning beam 29 upon the picture producing screen 27. Associated beam controlling and deflecting means of any suitable or preferred character, including electrostatic deflecting plates, within the envelope, or focusing and deflecting coils disposed outwardly of the envelope, may be provided for directing the scanning beam 29. Suitable vertical and horizontal sweep controlling generators 20′ and 21′ may be controllingly connected with the corresponding beam sweep control elements of the tube 25.

In order to actuate the picture tube 25, a record strip produced in the recorder 23 may be formed into an endless loop and mounted in a play-back device 23′ of any suitable, preferred or conventional character capable of accurately reproducing signals corresponding with those recorded in the record strip. The signal thus reproduced in the play-back device 23′ may be applied upon the electron gun 28, through a signal amplifier 19′ of any suitable or preferred sort, said amplifier being also connected to control the operation of the vertical and horizontal sweep generators 20′ and 21′. To this end, the amplifier may be connected with said sweep generators through conventional filter means 24′ capable of separating the beam sweep synchronizing signal components from the composite signal delivered by the amplifier 19′.

It will be seen from the foregoing that the present invention contemplates the production of recordable signals by scanning the picture pickup screen of the X-transducer tube 11 relatively slowly, whereby the record may be produced on inexpensive, low frequency apparatus and may be reproduced on comparable play-back equipment. After the object being pictured has been exposed to radiation for a relatively short period of time, an image thereof is formed on the X-transducer tube. Such image may be recorded magnetically as the result of a slow scan of the screened image. The record can then be played back at any convenient later time to permit the screened image to be viewed at the leisure of the operator; and the record can be formed into a loop to permit continuous viewing of the screened image during extended viewing intervals. An important advantage of the invention is that the object to be viewed need be exposed to X-rays only during a relatively short interval of time sufficient to produce a scannable image in the screen of the X-transducer tube; but the recorded picture image may be viewed during an interval of any desired length.

The short interval of X-radiation may be obtained by pulsing the source of X-radiation in the manner now to be described. X-ray tube 31 provides the X-radiation to X-transducer tube 11 which prior thereto passes through the test object 14 which may be a human being in medical applications of the invention.

X-ray source 31 is preferably a grid controlled X-ray tube and may be of the type, for example, disclosed in U.S. Patent No. 2,862,107 to H. R. Cummings. Other grid controlled X-ray tubes known in the art may also be used as the particular circumstances suggest.

Tube 31 comprises a cathode 32, control grid 33, and anode 34. An oscillating source of energy 35, e.g., 60 cycles/sec., is provided which, through step up transformer 36, applies an accelerating voltage between anode 34 and cathode 32. The secondary winding of transformer 36 is tapped at an appropriate intermediate point whereby one section 37 thereof provides the aforementioned anode-cathode potential while the remaining section 38 serves to heat the thermionic cathode 32 in manner well known in the art. In manner well known in the art, tube 31 may be disposed across a bridge-rectifying system (not shown) with a rectifier in each arm poled to provide full wave rectification. A bias supply 39 is disposed in circuit between cathode 32 and grid 33 and provides a bias thereto sufficient to maintain tube 31 in a cut-off or non-conducting condition at all times, except when a positive pulse is applied to relay 49 to close its contact 40 and shunt bias supply 39 out of the grid circuit. It is by virtue of this positive pulse to relay 49 that tube 31 is pulsed, i.e., conducts, and thus a discrete application of X-radiation is applied from tube 31 through test object 14 to X-transducer 11. This discrete application of X-radiation is timed to be applied to the X-transducer during the vertical retrace of the X-transducer scan beam in the manner now to be described.

The vertical sweep generator 20 applies a blanking pulse 41 to conductor 42. As is well known in the art, the blanking pulse is a negative going square wave whose main function is to eliminate any output from the pick up tube during that portion of the scan period (after a complete field has been scanned) when the vertical sweep is being restored to its initial scanning point. The blanking pulse usually performs this function by being applied to the intensity control grid of the tube, and suppresses any output signal as a consequence. The blanking pulse thus provides a convenient means to lock X-ray tube 31 operation to the vertical retrace. Vertical blanking and circuitry therefor is well known in the art, and for a more detailed discussion thereof, reference may be had to standard texts on the subject; for example, Fink's "Television Engineering Handback," chapter 17 (McGraw-Hill Book Co., Inc., 1957).

The negative blanking pulse on conductor 42 is applied to a standard differentiating circuit 43 which may comprise a series capacitor and shunt resistor. As is known in the art, when such a circuit has a time constant which is short compared to the width of the pulse exciting it, it will differentiate the pulse almost perfectly and provide two spiked impulses of opposite polarity representing the rise and fall of the input pulse. Thus, on the output conductor 44 of differentiator 43, there first appears a sharp negative impulse coincident with the leading negative-going edge of input pulse 41 which is followed by a sharp positive going impulse coincident with the trailing edge of pulse 41. These pulses are half-wave rectified in a standard rectifier circuit 45, which is poled so that only the negative impulse is passed, as shown on the output lead of rectifier circuit 45. As a consequence, conductor 46 will transmit a train of negative impulses, each one of which marks the lead edge of a blanking pulse and thus, the commencement of a vertical retrace period.

The negative impulses on lead 46 are then applied to a monostable multivibrator 47 such that each time that circuit 47 is excited by a negative impulse, it generates on its output lead 48 a positive pulse. A monostable multivibrator of this type is disclosed, for example, in Henney's "Radio Engineering Handbook," 5th edition (McGraw-Hill Book Co., Inc.), at pp. 16–54. The width of the positive pulse on lead 48 is dependent upon the time constant of the multivibrator circuit 47. Thus, the pulse width on lead 48 may be fixed to be any desired fraction of the width of blanking pulse 41 (or if need be, wider than the blanking pulse), and thus any desired fraction of the vertical retrace time by appropriately proportioning the time constant of circuit 47. The positive pulse then actuates relay 49 to close its contact 40 and thereby shunt the bias supply 39 from the grid circuit. With the bias supply removed, the X-ray tube is in its conduction state and remains so until the termination of the pulse from monostable multivibrator 47 results in the removal of the exciting voltage from relay 49. The contact 40 of relay 49 then springs open to reinsert bias supply 39 into the grid circuit of the X-ray tube, and thus the tube reverts to its non-conducting state.

In this way the discrete X-radiation commences solely at the beginning of the vertical retrace time and lasts for whatever part of the retrace time desired. Although in the embodiment described, the vertical blanking pulse was used to initiate the control of the X-ray tube 31, other signals may be used to insure that tube 31 is pulsed during the vertical retrace period such as, for example, the vertical sync pulse. The fraction of the retrace time over which radiation is applied is determined by the time constant of multivibrator 47, which may be varied by varying the value of a coupling capacitor between the two tubes of the multivibrator in the manner described in the above-mentioned "Radio Engineering Handbook." It follows, therefore, that considerable control is provided to insure that the intensity of applied radiation is great enough to cope with the finite rise time of the X-transducer, and short enough to maintain the integrated dosage low enough for safety in the case of a human test object.

In the embodiment of FIGS. 1 and 2, an extremely slow frame rate is used. Where, however, the rate is 15, 30 or 60 frames per second with vertical retrace times which may be, for example, of 0.5, 1.0 or 2.0 milliseconds, the action of a device such as relay 49 may be entirely too slow for switching the grid circuit of the X-ray tube. In lieu of the relay, a pulse amplifier may take its input from the output of multivibrator 47; the amplifier in turn excites the primary of a step-up transformer whose secondary is in series with grid 33 and bias supply 39. By controlling the positive pulse amplitude with the amplifier and step up transformer, the bias of supply 39 is overcome and the X-ray tube is driven into its conduction state. With the removal of the pulse, the bias 39 once more drives the tube into a non-conducting condition.

At frame rates of 15, 30 or 60 per second, and with test objects of great density, the integrated dose may be insufficient to register a picture of sufficient detail if the pulse lasts no longer than the vertical retrace time. The time constant of multivibrator 47 may then be varied in the manner described above, so that the width of the pulse extends beyond the retrace time into a portion of the scan period.

It is thought that the invention and its numerous attendant advantages will be fully understood from the foregoing description, and it is obvious that numerous changes may be made in the form, construction and arrangement of its several parts without departing from the spirit or scope of the invention, or sacrificing any of its attendant advantages, the form herein disclosed being a preferred embodiment for the purpose of illustrating the invention.

What I claim is:

1. An X-ray image intensification system comprising: a source of X-radiation; transducing means for converting X-radiation into electric signals, said means including a layer of semi-conductive material and means for scanning said layer at a given frame rate, said transducing means being disposed in the path of X-radiation from said source; and means coupled between said scanning means and said source for constraining the propagation of said X-radiation to discrete intervals each having a duration less than a frame period.

2. An X-ray image intensification system comprising: an X-ray generating tube; an X-ray transducer tube having a layer of photoconductive material and scanning means to scan said layer at a given frame rate; said X-ray transducer tube being disposed in the path of X-rays from said X-ray tube; a vertical sweep generator for generating vertical scan sweep voltages and vertical retrace blanking pulses; and circuit means coupled between said X-ray tube and said vertical sweep generator for rendering said X-ray tube conductive during an interval of time simultaneous with a portion of the vertical scan retrace time and less than a frame period.

3. An X-ray image intensification system as recited in claim 2, wherein said X-ray tube has a control grid which is biased to render said tube normally non-conducting, and said blanking pulse output from said vertical sweep generator excites said circuit means, said circuit means being adapted to apply a pulse to said control grid to render said X-ray tube conducting whenever said circuit means is excited by a blanking pulse.

4. An X-ray image intensification system comprising: an X-ray tube for generating X-radiation; an X-ray transducer tube having a layer of photoconductive material and scanning means to scan said layer at a given frame rate; said X-ray transducer being disposed in the path of X-rays from said X-ray tube; pulse generating means for generating a pulse at least partially coextensive in time with the vertical retrace period of said scanning means; and circuit means responsive to said pulse generating means for controlling the output of said X-ray tube.

5. An X-ray image intensification system as recited in claim 4, wherein said X-ray tube has a control grid which is biased to render said tube normally non-conducting, said circuit means being connected to said control grid to render said X-ray tube conducting whenever one of said pulses from said pulse generating means is applied to said circuit means.

6. For use with a television receiver having a given sensitivity, X-ray image intensification apparatus comprising: a source of X-radiation; transducing means disposed in the path of radiation from said source for converting X-radiation into electric signals; said transducing means including a layer of semi-conductive material and means for scanning said layer at a given frame rate; means coupled between said scanning means and said source for constraining the propagation of said X-radiation from said source to discrete intervals, each of which is a fraction of a frame period in duration; and means for establishing the intensity of said X-radiation from said source sufficiently great when integrated over one of said discrete intervals to result in a discernible image on said television receiver.

References Cited in the file of this patent

UNITED STATES PATENTS

| | | |
|---|---|---|
| 2,775,719 | Hansen | Dec. 25, 1956 |
| 2,809,323 | Jacobs et al. | Oct. 8, 1957 |
| 2,862,107 | Cummings | Nov. 25, 1958 |